No. 670,174. Patented Mar. 19, 1901.
G. GRABOSCH.
AMMETER.
(Application filed Oct. 12, 1900.)
(No Model.)
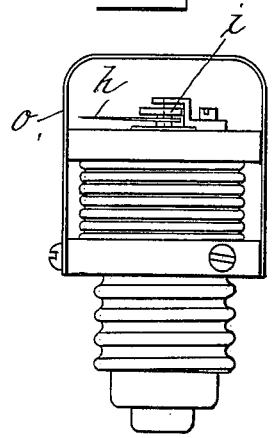
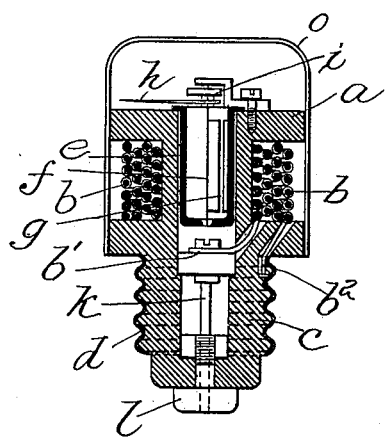
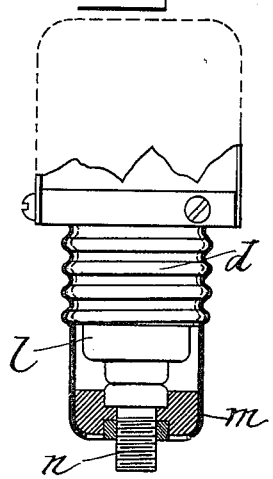
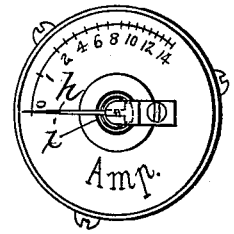
WITNESSES:
INVENTOR
Gustav Grabosch
BY
ATTORNEYS

UNITED STATES PATENT OFFICE.

GUSTAV GRABOSCH, OF BERLIN, GERMANY, ASSIGNOR TO GANS & GOLDSCHMIDT, OF SAME PLACE.

AMMETER.

SPECIFICATION forming part of Letters Patent No. 670,174, dated March 19, 1901.

Application filed October 12, 1900. Serial No. 32,827. (No model.)

*To all whom it may concern:*

Be it known that I, GUSTAV GRABOSCH, engineer, of No. 25 Reichenbergerstrasse, Berlin, Germany, have invented an Improvement in Ammeters, of which the following is a specification.

The subject of the present invention is an apparatus for measuring the strength of an electric current and is adapted for introduction into the holes or sockets provided for safety-fuses. Externally the new ammeter closely resembles a safety-plug, being provided with a metallic stem for the purpose of completing the circuit.

The apparatus is shown in the accompanying drawings.

Figure 1 is an elevation, Fig. 2 a vertical section, and Fig. 3 a face view, of the instrument. Fig. 4 shows a modification of the ammeter, in which a sleeve covers the screwed stem.

The apparatus consists of a spool $a$ of insulating material, such as wood or the like, having the shape of a safety-plug and being wound with wire $b$. The lower part or stem of the spool is provided with a screw-thread $c$, covered in the usual manner with a metal sheathing $d$. The spool $a$ is bored centrally, and into the bore a small cylinder $e$, closed below, is inserted. The cylinder contains a spindle $f$, carrying a long metal piece $g$, provided above with a pointer $h$ and spiral $i$. On rotation of the spindle the spring is compressed and on cessation of the motive force it expands, bringing the pointer back to its original position.

On the top of the spool $a$ a scale is arranged, as shown in Fig. 3, over which the pointer $h$ moves. In the bore of the spool is also contained the lead strip $k$, connected to one end $b'$ of the coil $b$ by means of an intermediate block, which can be connected to one pole of the circuit. The other end $b^2$ of the coil $b$ is connected with the metallic sheathing $d$, whereby it can be connected with the other pole of the circuit. If now the apparatus is inserted as a plug in the circuit, the latter, hitherto interrupted, will now be closed, the metal block $l$ and metal sheathing $d$ making contact with the poles of the circuit. The current will pass through the coil $b$ and acts repulsively on the metal piece $g$, mounted on the spindle $f$, causing a throw of the pointer over the scale. The amount of this deflection is a measure of the current strength.

In order to adapt the apparatus having an Edison screw-thread for Siemens connections, a metal sleeve $m$, Fig. 4, is applied to the sheathing $d$. The sleeve $m$ has a screw-thread above, but is smooth below. The screw $n$ is inserted into the sleeve $m$ and insulated from it by a block of non-conducting material, but is in metallic connection with the part $l$, so that the current passing through the conducting-screw in the manner described flows through the coil $b$ and causes deflection of the pointer. These devices can be employed either with or without the lead fuse.

In order to protect the pointer and internal parts of the device, a cap $o$ of transparent material—such as celluloid, mica, glass, or the like—may be fitted over the whole apparatus. The cap may also be made of opaque material, having a transparent top through which to observe the pointer.

I claim—

1. An ammeter, comprising a centrally-bored bobbin of plug form, the bobbin-coils, a spindle mounted in said boring, a metal piece secured to said spindle, a spring-actuated pointer mounted on said spindle and deflected on a current passing through the bobbin-coils, a scale for said pointer and means for connecting the respective ends of the bobbin-coil to the poles of the circuit, in such manner that when the ammeter is connected in the circuit by being inserted into a safety-plug hole, the current passes through its coil and deflects the pointer, substantially as described.

2. An ammeter, comprising a centrally-bored bobbin of plug form, the bobbin-coils, a spindle mounted in said boring, a metal piece secured to said spindle, a spring-actuated pointer mounted on said spindle and deflected on a current passing through the bobbin-coils, a scale for said pointer, a safety-fuse located in said boring and connecting one end of the bobbin-coil to one pole of the circuit, and means for connecting the other end of the bobbin-coil with the other pole of the circuit, substantially as described.

3. An ammeter, comprising a centrally-bored bobbin of plug form having a screw-threaded stem, the bobbin-coils, a spindle mounted in said boring, a metal piece secured to said spindle, a spring-actuated pointer mounted on said spindle and deflected on a current passing through the bobbin-coils, a scale for said pointer, a metallic piece secured to the base of the bobbin and connected to one end of the bobbin-coil, and a metallic sheathing on the said bobbin-stem connected to the other end of said coil, substantially as described.

4. An ammeter, comprising a centrally-bored bobbin of plug form having a screw-threaded stem, the bobbin-coils, a spindle mounted in said boring, a metal piece secured to said spindle, a spring-actuated pointer mounted on said spindle and deflected on a current passing through the bobbin-coils, a scale for said pointer, a metallic piece secured to the base of the bobbin and connected to one end of the bobbin-coil, and a metallic sheathing on the said bobbin-stem connected to the other end of said coil, in combination with a metallic sleeve adapted to screw over said stem and having a smooth lower part, and a screw secured to, but insulated from said sleeve, and making electrical contact with said metallic base-piece of the bobbin, substantially as described.

In testimony that I claim the foregoing as my invention I have signed my name in presence of two subscribing witnesses.

GUSTAV GRABOSCH.

Witnesses:
HENRY HASPER,
WOLDEMAR HAUPT.